(12) United States Patent
Aizawa

(10) Patent No.: US 11,708,955 B2
(45) Date of Patent: Jul. 25, 2023

(54) LIGHTING BODY FOR VEHICLE

(71) Applicant: HONDA MOTOR CO., LTD., Tokyo (JP)

(72) Inventor: Hideaki Aizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 486 days.

(21) Appl. No.: 16/878,646

(22) Filed: May 20, 2020

(65) Prior Publication Data
US 2020/0386381 A1    Dec. 10, 2020

(30) Foreign Application Priority Data

May 29, 2019   (JP) .............................. JP2019-099882

(51) Int. Cl.
*F21S 41/275* (2018.01)
*G01S 13/931* (2020.01)
(Continued)

(52) U.S. Cl.
CPC .......... *F21S 41/275* (2018.01); *B60Q 1/0023* (2013.01); *G01S 7/4813* (2013.01);
(Continued)

(58) Field of Classification Search
CPC .... F21S 41/275; B60Q 1/0023; G01S 7/4813; G01S 2013/93277
(Continued)

(56) References Cited

U.S. PATENT DOCUMENTS 8,803,728 B2 *  8/2014  Yonemoto ............ H01Q 1/3225
                                              362/539
9,022,417 B2 *  5/2015  Breed ................. B60R 21/0132
                                              280/728.3
(Continued)

FOREIGN PATENT DOCUMENTS

CN        1607353       4/2005
CN       102889535      1/2013
(Continued)

OTHER PUBLICATIONS

Chinese Office Action for Chinese Patent Application No. 202010390312.3 dated Dec. 9, 2021.
(Continued)

*Primary Examiner* — Nuzhat Pervin
(74) *Attorney, Agent, or Firm* — Amin, Turocy & Watson, LLP

(57) ABSTRACT

A lighting body for a vehicle includes a housing, an outer lens configured to form a lamp chamber between the housing and the outer lens, a millimeter wave radar disposed outside the lamp chamber and transmits millimeter waves toward a side outward of the vehicle, and a light source disposed in the lamp chamber and emits light toward the side outward of the vehicle through the outer lens, the millimeter wave radar being held in the housing in a state the millimeter wave radar is combined with the housing from an inward side of the vehicle, a first functional membrane allows penetration of the millimeter waves and allows penetration and reflection of the light being formed on the outer lens, and a second functional membrane allows penetration of the millimeter waves and allows at least reflection of the light reflected by the first functional membrane being formed on the housing.

3 Claims, 3 Drawing Sheets

(51) Int. Cl.
*B60Q 1/00* (2006.01)
*G01S 7/481* (2006.01)

(52) U.S. Cl.
CPC ... *G01S 13/931* (2013.01); *G01S 2013/93271* (2020.01); *G01S 2013/93277* (2020.01)

(58) Field of Classification Search
USPC .......................................................... 342/70
See application file for complete search history.

(56) References Cited

U.S. PATENT DOCUMENTS

| | | | | |
|---|---|---|---|---|
| 9,134,585 B2 * | 9/2015 | Tonar | ..................... | G02F 1/161 |
| 9,701,248 B2 * | 7/2017 | Neuman | ................... | B60R 1/06 |
| 11,467,284 B2 * | 10/2022 | Yamamoto | ........... | B60Q 1/0023 |
| 2004/0219366 A1 * | 11/2004 | Johnson | ................ | B32B 27/365 |
| | | | | 428/480 |
| 2008/0158897 A1 * | 7/2008 | Nakamura | ........... | G01S 13/931 |
| | | | | 342/73 |
| 2008/0180965 A1 * | 7/2008 | Nakamura | ........... | B60Q 1/0023 |
| | | | | 362/507 |
| 2009/0219191 A1 * | 9/2009 | Natsume | .............. | B60Q 1/0023 |
| | | | | 342/109 |
| 2011/0279304 A1 * | 11/2011 | Yonemoto | ............ | H01Q 19/062 |
| | | | | 342/52 |
| 2017/0158111 A1 * | 6/2017 | Zawacki | .............. | B60Q 1/2607 |
| 2018/0194272 A1 * | 7/2018 | Hibino | ................... | B60Q 1/143 |

FOREIGN PATENT DOCUMENTS

| | | | | |
|---|---|---|---|---|
| CN | 104097568 | 10/2014 | | |
| CN | 104986096 | 10/2015 | | |
| CN | 105318252 | 2/2016 | | |
| JP | 09-115305 | 5/1997 | | |
| JP | 2009-202756 | 9/2009 | | |
| JP | 2010-015721 | 1/2010 | | |
| JP | 2010-137758 | 6/2010 | | |
| JP | 4842161 | 12/2011 | | |
| JP | 4919179 B2 * | 4/2012 | ........... | B60Q 1/0023 |
| JP | 2019-057481 | 4/2019 | | |
| WO | WO-2019021693 A1 * | 1/2019 | ........... | B60Q 1/0023 |

OTHER PUBLICATIONS

Japanese Office Action for Japanese Patent Application No. 2019-099882 dated Feb. 22, 2022.

* cited by examiner

LIGHTING BODY FOR VEHICLE

CROSS-REFERENCE TO RELATED APPLICATION

Priority is claimed on Japanese Patent Application No. 2019-099882, filed May 29, 2019, the content of which is incorporated herein by reference.

BACKGROUND OF THE INVENTION

Field of the Invention

The present invention relates to a lighting body for a vehicle.

Description of Related Art

In the related art, a millimeter wave radar (millimeter wave sensors) using millimeter waves is known, and used in a wide variety of fields. The millimeter waves are, for example, electromagnetic waves having good straightness and having a frequency within a range from 30 GHz to 300 GHz and having a wavelength within a range from 1 mm to 10 mm, and have properties close to light. For this reason, this can be handled like a laser. Accordingly, a millimeter wave radar using millimeter waves is hardly affected by weather, daytime and nighttime, or the like, and can be used for detecting, for example, a distance, an angle, a speed, and the like, between the radar and a detection object.

Vehicles equipped with a millimeter wave radar have been practically applied utilizing such properties of millimeter waves. For example, by mounting a millimeter wave radar on the front side of a vehicle, it is possible to detect a distance between a host vehicle and a preceding vehicle and use the distance for a forward monitoring system or the like. Further, since a millimeter wave radar can be mounted on a rear section side or a side section side of a vehicle, a millimeter wave radar can be used for rearward monitoring, lateral monitoring, or the like, and this can contribute to safe driving assistance.

A millimeter wave radar may be mounted on a front section side of a vehicle, and for example, a lighting body for a vehicle in which a millimeter wave radar is disposed in a lamp chamber of a headlight is known (for example, see Japanese Patent No. 4842161). In a lighting body for a vehicle, a light source unit, a millimeter wave radar and a light guide lens are disposed in a lamp chamber formed between a lamp body and an outer lens. The light guide lens is disposed between the outer lens and the millimeter wave radar while being disposed in front of the millimeter wave radar. The light guide lens can emit light by causing some of the light emitted from the light source unit to enter therethrough, and can allow the millimeter waves transmitted from the millimeter wave radar to penetrate therethrough. Accordingly, according to the lighting body for a vehicle in the related art, the light guide lens emits light so that it can be seen as a lamp, and the millimeter wave radar can be made less noticeable.

SUMMARY OF THE INVENTION

In the lighting body for a vehicle in the related art, since the millimeter wave radar is disposed in the lamp chamber, it is difficult to ensure sufficient heat dissipation. In particular, the lamp chamber is hermetically sealed, and since various components are arranged in a dense state, heat readily accumulates therein. Accordingly, it is difficult to sufficiently dissipate heat from the millimeter wave radar, which may affect radar performance.

In addition, the temperature in the lamp chamber tends to rise due to an influence of the solar radiation caused by solar light entering the lamp chamber, and the temperature may be increased when solar light directly hits the millimeter wave radar. Accordingly, there is even greater concern regarding the above-mentioned problem of heat dissipation.

Further, since the millimeter wave radar is disposed in the lamp chamber, for example, maintenance, exchange, or the like, of the millimeter wave radar cannot be easily performed. For this reason, since workability is poor and this also leads to high costs, there is a problem with serviceability.

An aspect of the present invention is directed to providing a lighting body for a vehicle having good design performance by making a millimeter wave radar less visible from outside while heat dissipation and serviceability can be improved and radar performance can be stably maintained.

(1) A lighting body for a vehicle according to the present invention includes a housing; an outer lens that is assembled to the housing so as to cover the housing from an outside of the vehicle and that is configured to form a lamp chamber between the housing and the outer lens; a millimeter wave radar that is positioned on a side further inward in the vehicle than the housing and that is disposed an outside of the lamp chamber, and that is configured to transmit millimeter waves toward a side outward of the vehicle through the housing and the outer lens; and a light source that is disposed in the lamp chamber and that is configured to emit light toward the side outward of the vehicle through the outer lens, wherein the millimeter wave radar is held in the housing in a state the millimeter wave radar is combined with the housing from an inward side of the vehicle, a first functional membrane configured to allow penetration of the millimeter waves and to allow penetration and reflection of the light is formed on the outer lens, and a second functional membrane configured to allow penetration of the millimeter waves and to allow at least reflection of the light reflected by the first functional membrane is formed on the housing.

According to the lighting body for a vehicle according to the present invention of the above-mentioned (1), since the millimeter waves can penetrate the first functional membrane and the second functional membrane, the millimeter waves transmitted from the millimeter wave radar can be transmitted toward the side outward of the vehicle through the housing and the outer lens. In particular, since the millimeter wave radar is combined with the housing from the inward side of the vehicle and disposed outside the lamp chamber, heat dissipation of the millimeter wave radar can be improved. Accordingly, heat generated according to the operation of the millimeter wave radar can be efficiently radiated, and safety of the operation can be appropriately maintained. For this reason, radar performance can be stably maintained.

Further, since the millimeter wave radar is combined with the housing from the inward side in the vehicle and disposed outside the lamp chamber, the millimeter wave radar cannot be easily seen from the outside through the outer lens in comparison with the case in which the entire millimeter wave radar is disposed in the lamp chamber like in the related art. Accordingly, an external appearance without having a sense of incongruity can be provided, and design properties and design performance of the lighting body for a vehicle can be secured.

Further, since the millimeter wave radar is combined with the housing from the inward side in the vehicle, the millimeter wave radar can be easily removed from the housing. Accordingly, for example, maintenance, exchange, or the like, of the millimeter wave radar is easily performed, workability thereof can be improved, and costs according to the works can be minimized. Accordingly, this leads to improvement of serviceability.

Further, since the first functional membrane is formed on the outer lens, some of the light emitted from the light source can penetrate the first functional membrane to be emitted toward the side outward from the vehicle, and the remaining light can be reflected toward the housing. Further, since the second functional membrane is also formed on the housing, the light reflected by the first functional membrane can be further reflected toward the outer lens. For this reason, some of the light reflected by the second functional membrane can penetrate the first functional membrane again to be emitted toward the outward side of the vehicle, and the remaining light can be reflected toward the housing again.

In this way, the light emitted from the light source can be emitted toward the side outward of the vehicle while repeating reflection between the outer lens and the housing using the first functional membrane and the second functional membrane. Accordingly, the light emitted from the light source can be emitted toward the outward side of the vehicle in a predetermined light emitting pattern. Accordingly, a lighting function can be provided, and for example, this can also be used as light for a position light, a stop light, a turn light, or the like. Moreover, the millimeter wave radar cannot be easily seen from the outside through the outer lens using the light emitted in the predetermined light emitting pattern. Accordingly, presence of the millimeter wave radar can be hidden, an external appearance without having a sense of incongruity can be further provided, and design performance can be secured.

Further, since the first functional membrane is formed on the outer lens, solar light can also be reflected using the first functional membrane, and an amount of solar radiation entering the lamp chamber can be minimized. For this reason, an increase in temperature in the lamp chamber can be minimized, an operation reliability of the lighting body for a vehicle can be improved, and an influence of solar radiation on the millimeter wave radar can also be minimized.

(2) In the aspect of the above-mentioned (1), the first functional membrane may be formed on an inner surface of the outer lens exposed to an inside of the lamp chamber, and the second functional membrane may be formed on a facing surface of the housing exposed to the inside of the lamp chamber and facing the inner surface.

In this case, since the first functional membrane and the second functional membrane are disposed in the lamp chamber, for example, dust, moisture, or the like, from the outside cannot easily adhere to the first functional membrane and the second functional membrane, and both of the functional membranes can be kept clean. For this reason, radar performance can be stably maintained for a long time, and the light from the light source can be appropriately emitted in the predetermined light emitting pattern.

(3) In the aspect of the above-mentioned (1) or (2), a plurality of light sources may be disposed outside a transmission path of the millimeter waves.

In this case, since the transmitted millimeter waves do not interfere with the light source on its way, the millimeter waves can be transmitted while minimizing attenuation of the millimeter waves, and this leads to improvement of radar performance.

In addition, since the light emitted from the plurality of light sources can be emitted toward the side outward of the vehicle while repeating reflection between the outer lens and the housing, the light can be emitted in various light emitting patterns, and a lighting function can be further improved.

(4) In the aspect of any one of the above-mentioned (1) to (3), the first functional membrane and the second functional membrane may be indium-deposited films.

In this case, since the indium-deposited films are used for the first functional membrane and the second functional membrane, penetration of the millimeter waves and penetration and reflection of the light from the light source can be more reliably performed.

According to the lighting body for a vehicle according to the present invention, heat dissipation and serviceability can be improved and radar performance can be stably maintained, and also the millimeter wave radar cannot be easily seen from the outside, thereby good design performance can be provided.

DETAILED DESCRIPTION OF THE INVENTION

Hereinafter, an embodiment of a lighting body for a vehicle according to the present invention will be described with reference to the accompanying drawings.

In the embodiment, an example in which the lighting body for a vehicle is applied to a tail light unit provided on a rear section side of a vehicle will be described.

Figure 1:
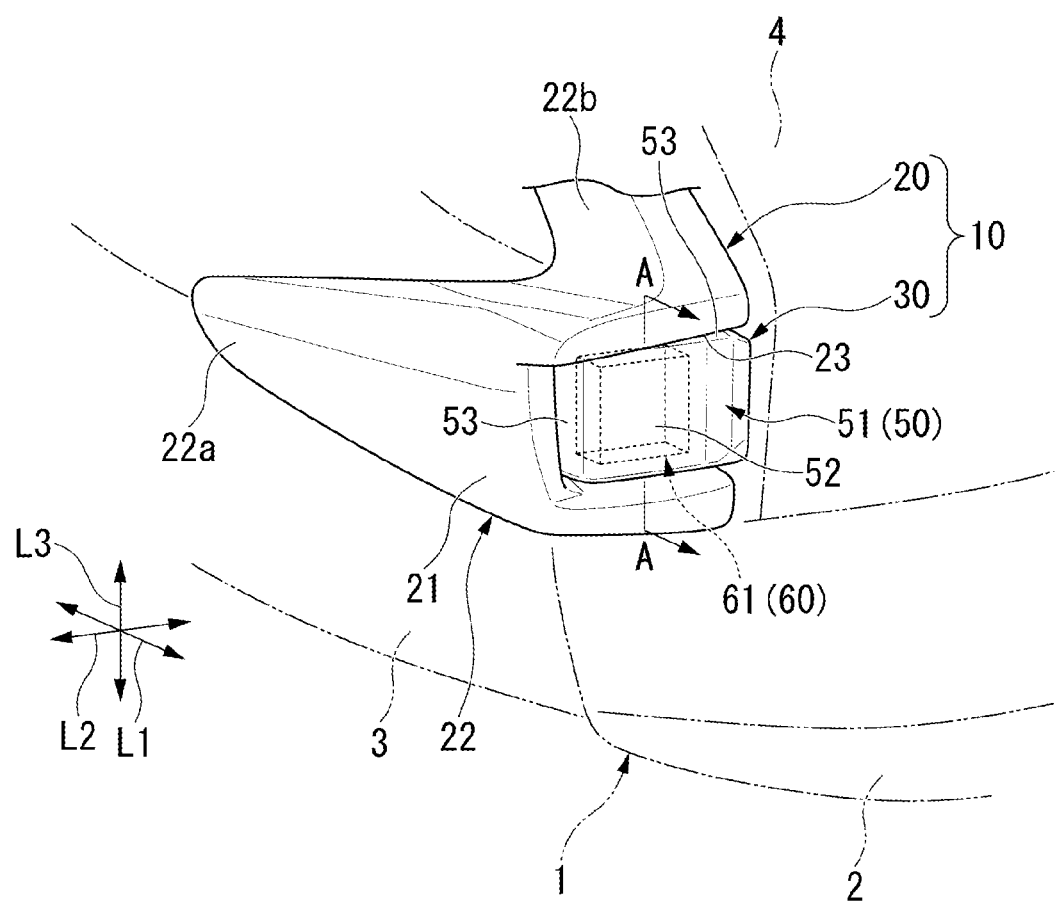
FIG. 1 is a perspective view of a tail light unit including a subsidiary light unit (a lighting body for a vehicle) according to the present invention.

As shown in FIG. 1, in the vehicle, a rear section of a vehicle body 1 is constituted by, for example, a rear bumper 2, left and right rear fenders 3, a tail gate 4, and the like. Further, for example, left and right tail light units 10 are disposed on both sides of the tail gate 4. Further, the vehicle shown in FIG. 1 is merely an example, and a vehicle body structure or the like that constitutes the rear section of the vehicle body 1 may be changed according to a type, a model year, a size, or the like, of a vehicle.

In the embodiment, directions are defined on the basis of an orientation of the vehicle shown in FIG. 1. That is, in a forward/rearward direction L1 of the vehicle, a forward side when seen from a driver is referred to as a forward direction and a side opposite thereto is referred to as a rearward direction. In addition, in a vehicle width direction L2 of the vehicle, a right-hand side of the driver is referred to as a rightward side, a left-hand side is referred to as a leftward side, upper side with respect to the driver is referred to as an upper side, and lower side with respect to the driver is referred to as a lower side.

Since the left and right tail light units 10 have a laterally symmetrical relation and the same configuration, in the embodiment, the tail light unit 10 on the left side will be described in detail, and description of the tail light unit 10 on the right side will be omitted.

The tail light unit 10 is a unit obtained by combining a main light unit 20 and a subsidiary light unit (a lighting body for a vehicle according to the present invention) 30.

The main light unit 20 includes a main light case 22 having a main bracket (not shown) and a main outer lens 21 combined with a main bracket to cover the main bracket from a rearward side. The main outer lens 21 is formed of, for example, a transparent or translucent synthetic resin. However, a material of the main outer lens 21 is not limited to the above-mentioned case.

The main light case 22 includes a forward extension section 22a extending toward a front side of the vehicle body 1 along the rear fender 3 on the left side, and an upward extension section 22b extending upward along the tail gate 4.

Further, the main light case 22 is formed in a 3-dimensional shape such that an accommodating space 23 with which the subsidiary light unit 30 is combined is secured in a portion disposed on the right side of the forward extension section 22a and below the upward extension section 22b. The accommodating space 23 is a space that opens rightward while the main light case 22 passes therethrough in the forward/rearward direction L1.

A closed lamp chamber is formed in the main light case 22, i.e., between the main bracket and the main outer lens 21. Various light sources (not shown) are provided in the lamp chamber, and for example, may be used as light sources for various lights such as a stop light that is a brake lamp, a turn light that is a vehicle direction indicator lamp, a reversing light that is a reversing lamp, and the like.

Accordingly, the main light unit of the embodiment functions as, for example, a combination light to which the stop light, the turn light, the reversing light, and the like, are assembled integrally.

Figure 2:
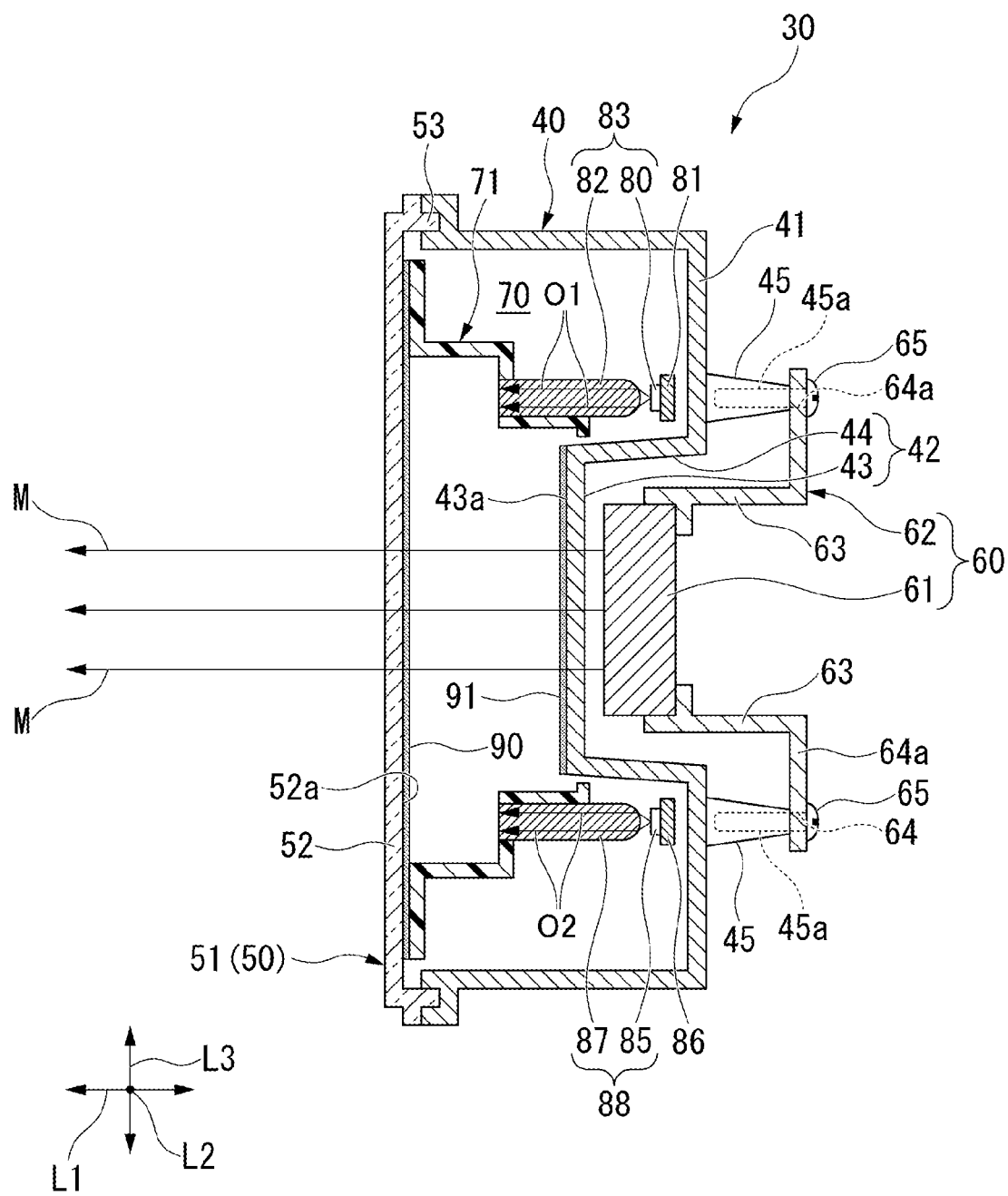
FIG. 2 is a lateral cross-sectional view of a subsidiary light unit taken along line A-A in FIG. 1.

As shown in FIG. 1 and FIG. 2, the subsidiary light unit 30 is integrally combined with the main light unit 20 to be fitted into the above-mentioned accommodating space 23.

The subsidiary light unit 30 includes a subsidiary housing (a housing according to the present invention) 40, a subsidiary outer lens (an outer lens according to the present invention) 50 integrally combined with the subsidiary housing 40 to cover the subsidiary housing 40 from a side to the rear (outside of the vehicle), and a millimeter wave radar 60 disposed in front of a facing wall section 43 (inside of the vehicle) (to be described below) in the subsidiary housing 40 and configured to transmit millimeter waves M rearward through the facing wall section 43 and the subsidiary outer lens 50.

Like the main outer lens 21, the subsidiary outer lens 50 is formed of, for example, a transparent or translucent synthetic resin. However, a material of the subsidiary outer lens 50 is not limited to this case.

The subsidiary outer lens 50 includes at least a lens main body 51 swelling rearward. The lens main body 51 includes a rectangular top lens 52 longer in the vehicle width direction L2 than in an upward/downward direction L3 when seen from a side to the rear of the vehicle, and four side lenses 53 continuously connected to the top lens 52 and protruding forward from an outer circumferential edge portion of the top lens 52, and is formed in a substantially rectangular parallelepiped shape as a whole.

The subsidiary housing 40 is disposed in front of the subsidiary outer lens 50 and integrally combined with the subsidiary outer lens 50.

In the subsidiary housing 40, a swelling section 42 having a topped cylindrical shape and swelling rearward is formed in a part of a housing wall 41 facing the top lens 52 in the forward/rearward direction L1. The swelling section 42 is formed in a central section in the housing wall 41 in the upward/downward direction L3 and the vehicle width direction L2.

The swelling section 42 includes the facing wall section 43 disposed so as to face the top lens 52, and a circumferential wall section 44 having a tubular shape and continuously provided on the housing wall 41 while protruding forward from the outer circumferential edge portion of the facing wall section 43.

Accordingly, the subsidiary housing 40 of the embodiment is configured to have the facing wall section 43 in at least a part thereof. However, the embodiment is not limited to this case. In addition, the entire subsidiary housing 40 including the swelling section 42 may be formed such that the millimeter waves M transmitted from the millimeter wave radar 60 can penetrate therethrough.

In addition, a plurality of boss sections 45 protruding forward are formed on the housing wall 41. The plurality of boss sections 45 are disposed at intervals in the vehicle width direction L2 and the upward/downward direction L3. Further, connecting screw holes 45a that open forward are formed in the boss sections 45.

An internal space between the subsidiary housing 40 and the subsidiary outer lens 50 that are configured as described above functions as a closed lamp chamber 70. A light source configured to emit light rearward through the subsidiary outer lens 50 is disposed in the lamp chamber 70.

In the embodiment, two light sources of a first light source 80 and a second light source 85 are disposed in the lamp chamber 70. For example, while an LED or the like may be exemplified as the first light source 80 and the second light source 85, there is no particular limitation thereto. The first light source 80 and the second light source 85 are disposed with an interval therebetween in the upward/downward direction L3 with the swelling section 42 sandwiched therebetween. However, it is not limited thereto, and the number, disposition, or the like, of the light sources may be appropriately changed.

The first light source 80 is disposed above the swelling section 42 and mounted on a first control board 81 supported by a support member (not shown). A first light guide body 82 extending in the forward/rearward direction L1 is disposed between the first light source 80 and the top lens 52 in the subsidiary outer lens 50. The first light guide body 82 can guide light O1 emitted from the first light source 80 toward the rearward side, and for example, emit the light rearward while making the light a parallel light. Further, the first light source 80 and the first light guide body 82 function as a first optical system 83.

The second light source 85 is disposed below the swelling section 42, and mounted on a second control board 86 supported by a support member (not shown). A second light guide body 87 extending in the forward/rearward direction L1 is disposed between the second light source 85 and the top lens 52 in the subsidiary outer lens 50. The second light guide body 87 can guide light O2 emitted from the second light source 85 toward the rearward side, and for example, can emit light rearward while making the light a parallel light. Further, the second light source 85 and the second light guide body 87 function as a second optical system 88.

The first optical system 83 including the first light source 80 and the second optical system 88 including the second light source 85, which are configured as above, are disposed outside a transmission path of the millimeter waves M (outside an irradiation range) transmitted from the millimeter wave radar 60. That is, when the vehicle is seen from the rear, the first optical system 83 and the second optical system 88 are disposed in a region that does not overlap a radar main body 61 of the millimeter wave radar 60 in the forward/rearward direction L1.

Further, an extension 71 that is a holding member configured to hold the first light guide body 82 and the second light guide body 87 is disposed in the lamp chamber 70.

The extension 71 is formed of, for example, a synthetic resin, and formed in a tubular shape having a diameter that gradually increases toward the top lens 52 while surrounding the swelling section 42. However, a shape of the extension 71 is not particularly limited to this case and may be appropriately changed.

The millimeter wave radar 60 includes the radar main body 61 configured to transmit and receive the millimeter waves M, and a radar bracket 62 configured to support the radar main body 61.

The radar main body 61 mainly has a transmission antenna (not shown) configured to transmit the millimeter waves M, a receiving antenna (not shown) configured to receive the millimeter waves M reflected by a detection object, and a signal generating section (not shown) configured to generate a detection signal on the basis of a signal of the transmitted millimeter waves M and a signal of the received millimeter waves M, which are provided therein. Accordingly, for example, it is possible to detect a distance or the like to a detection object on the basis of the detection signal generated by the signal generating section.

The radar bracket 62 includes a plurality of holding arms 63 configured to detachably hold the radar main body 61, and flange pieces 64 formed integrally with front end portions of the holding arms 63. The holding arms 63 are disposed to enter the swelling section 42 from a forward side, and detachably hold the radar main body 61 mainly using the rear end portion side.

The flange pieces 64 are formed in an annular shape to protrude from front end portions of the holding arms 63 in the vehicle width direction L2 and the upward/downward direction L3, and disposed in front of the housing wall 41. A plurality of insertion holes 64a through which connecting screws 65 are inserted are formed in the flange pieces 64 to face the connecting screw hole 45a.

The millimeter wave radar 60 configured as above is held in the subsidiary housing 40 while being combined with the subsidiary housing 40 from the front, and disposed outside the lamp chamber 70. Specifically, the millimeter wave radar 60 is combined with the subsidiary housing 40 such that the radar main body 61 enters the swelling section 42 from the forward side. Here, since the flange pieces 64 come in contact with the boss sections 45 formed on the subsidiary housing 40 from the front, the entire millimeter wave radar 60 is positioned. Then, the millimeter wave radar 60 is integrally combined with the subsidiary housing 40 by the connecting screws 65 screwed to the connecting screw holes 45a through the insertion holes 64a.

Since the millimeter wave radar 60 is attached as described above, the radar main body 61 is disposed while being close to the facing wall section 43 in the subsidiary housing 40 on the forward side of the facing wall section 43.

Incidentally, a first functional membrane 90 configured to allow penetration of the millimeter waves M transmitted from the millimeter wave radar 60 and allow penetration and reflection of the light O1 and O2 emitted from the first light source 80 and the second light source 85 is formed on the subsidiary outer lens 50. Specifically, the first functional membrane 90 is formed on an inner surface 52a of the top lens 52 of the subsidiary outer lens 50 exposed to the inside of the lamp chamber 70. An indium-deposited film formed through vapor deposition or the like of indium on the inner surface 52a of the top lens 52 is provided as the first functional membrane 90.

However, the first functional membrane 90 is not limited to the indium-deposited film as long as penetration of the millimeter waves M is allowed and penetration and reflection of the lights O1 and O2 emitted from the first light source 80 and the second light source 85 are possible, and may be a deposition film formed of another metal.

Since the first functional membrane 90 that is the indium-deposited film is formed on the inner surface 52a of the top lens 52 as described above, as shown in FIG. 3, the light O1 from the first light source 80 and the light O2 from the second light source 85 can penetrate through the first functional membrane 90 and be reflected by the first functional membrane 90 while allowing penetration of the millimeter waves M. Accordingly, the first functional membrane 90 functions as a so-called half deposition film with respect to the light O1 from the first light source 80 and the light O2 from the second light source 85.

Further, the top lens 52 has, for example, a curvature or the like that is locally adjusted such that light reflected by the first functional membrane 90 moves forward to a second functional membrane 91, which will be described below. In addition, a penetration ratio of the millimeter waves M can be adjusted, or a ratio between the penetration ratio and the reflection ratio of the light O1 from the first light source 80 and the light O2 from the second light source 85 can be arbitrarily adjusted by adjusting the film thickness of the first functional membrane 90. In the embodiment, for example, the ratio between the penetration ratio and the reflection ratio of the light O1 from the first light source 80 and the light O2 from the second light source 85 is adjusted to have a penetration ratio of 50% and a reflection ratio of 50%.

Figure 3:
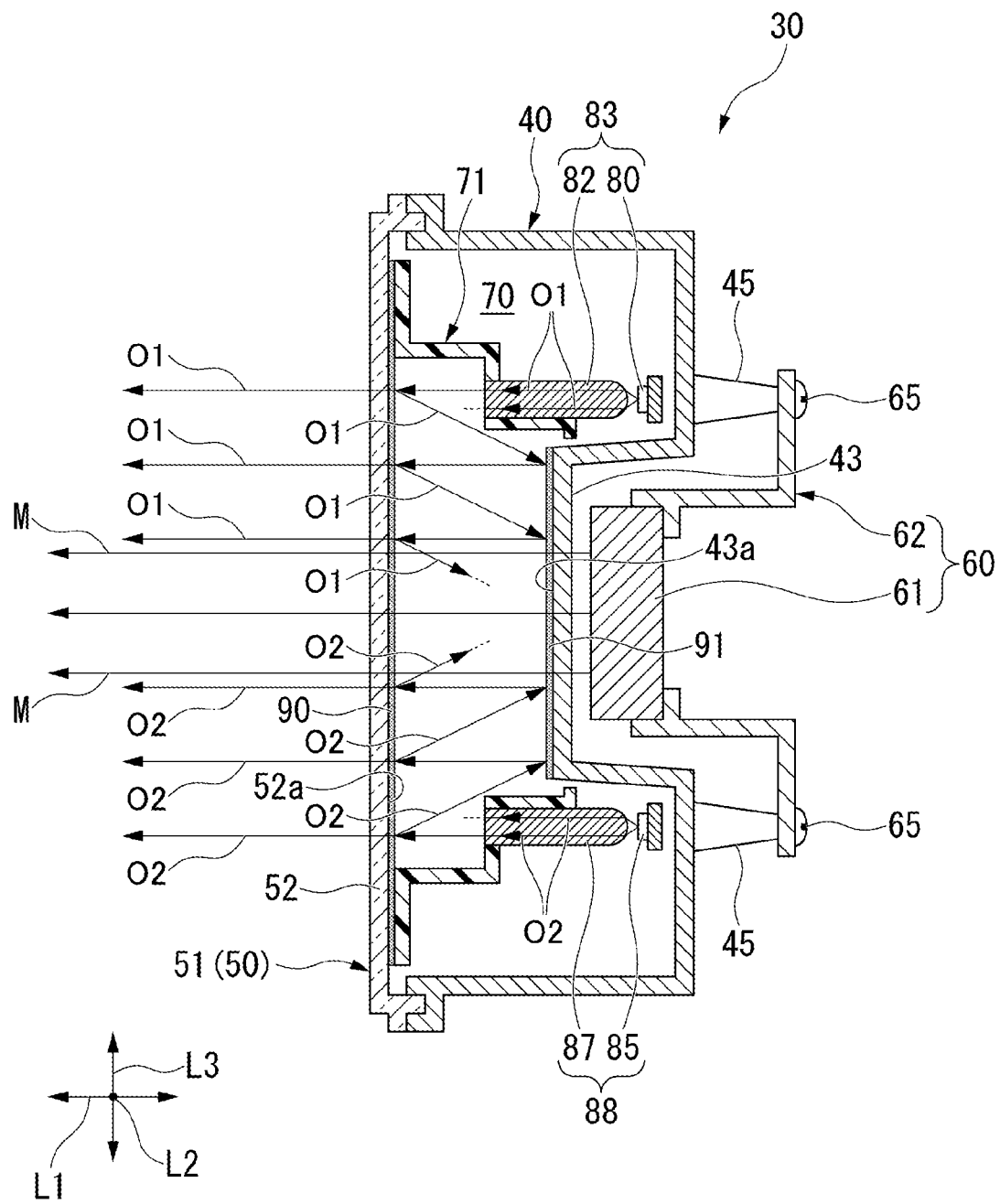
FIG. 3 is a view showing a state in which a first light source and a second light source emit light and millimeter wave radar transmits millimeter waves from a state shown in FIG. 2.

Further, as shown in FIG. 2 and FIG. 3, the second functional membrane 91 configured to allow penetration of the millimeter waves M transmitted from the millimeter wave radar 60 and reflect at least the lights O1 and O2 reflected by the first functional membrane 90 is formed on the facing wall section 43. Specifically, the second functional membrane 91 is formed on an inner surface (a facing surface according to the present invention) 43a of the facing wall section 43 exposed to the inside of lamp chamber 70. As the second functional membrane 91, like the first functional membrane 90, the indium-deposited film formed through vapor deposition or the like of indium is formed on the inner surface 43a of the facing wall section 43.

However, the second functional membrane 91 is not limited to the indium-deposited film as long as penetration of the millimeter waves M is allowed and at least reflection of the lights O1 and O2 reflected by the first functional membrane 90 is possible, and may be a deposition film formed of another metal.

Since the second functional membrane 91 that is the indium-deposited film is formed on the inner surface 43a of the facing wall section 43 as described above, the lights O1 and O2 reflected by the first functional membrane 90 can be further reflected rearward while penetration of the millimeter waves M is allowed. Accordingly, the facing wall section 43 on which the second functional membrane 91 is formed functions as a so-called reflector configured to reflect the light O1 from the first light source 80 and the light O2 from the second light source 85.

Further, for example, the facing wall section 43 has a curvature or the like that is locally adjusted such that the lights O1 and O2 reflected by the second functional membrane 91 go straight ahead, for example, rearward in the forward/rearward direction L1. In addition, the penetration ratio of the millimeter waves M is adjusted or the ratio between the penetration ratio and the reflection ratio of the light O1 from the first light source 80 and the light O2 from the second light source 85 can be arbitrarily adjusted by adjusting the film thickness of the second functional membrane 91.

Actions of Subsidiary Light Unit

Next, in the tail light unit 10 configured as described above, actions of the subsidiary light unit 30 will be mainly described.

According to the subsidiary light unit 30 of the embodiment, since each of the first functional membrane 90 and the second functional membrane 91 enables penetration of the millimeter waves M, as shown in FIG. 3, the millimeter waves M transmitted from the millimeter wave radar 60 can be transmitted rearward, i.e., toward the outside of the vehicle, through the facing wall section 43 and the subsidiary outer lens 50.

In particular, since the millimeter wave radar 60 is disposed outside the lamp chamber 70 by combining the millimeter wave radar 60 with the subsidiary housing 40 from the front that is the inside of the vehicle, heat dissipation of the millimeter wave radar 60 can be improved. Accordingly, heat generated according to an operation of the millimeter wave radar 60 can be efficiently radiated, and safety of the operation can be appropriately maintained. For this reason, radar performance can be stably maintained. Further, since sealability in the lamp chamber 70 can be secured by the subsidiary housing 40 and the subsidiary outer lens 50, intrusion of dust, moisture, or the like, into the lamp chamber 70 can be prevented, and reliability of a function of the lighting body can be secured.

Further, since the millimeter wave radar 60 is combined with the subsidiary housing 40 from the front that is the inside of the vehicle, in comparison with the case in which the entire millimeter wave radar 60 is disposed in the lamp chamber 70 like in the related art, the millimeter wave radar 60 cannot be easily seen from the outside through the subsidiary outer lens 50. Accordingly, an external appearance without a sense of incongruity can be provided, and design properties and design performance of the subsidiary light unit 30 can be secured.

Further, since the millimeter wave radar 60 is combined with the subsidiary housing 40 from the front that is the inside of the vehicle, the millimeter wave radar 60 can be easily removed from the subsidiary housing 40. Accordingly, for example, maintenance, exchange, or the like, of the millimeter wave radar 60 is easily performed, workability thereof can be improved, and costs according to the work can be minimized. Accordingly, this can lead to improvement of serviceability.

Further, since the first functional membrane 90 is formed on the top lens 52 in the subsidiary outer lens 50, some of the lights O1 and O2 emitted from the first light source 80 and the second light source 85 through the first light guide body 82 and the second light guide body 87 can penetrate the first functional membrane 90 to be emitted rearward, and the remaining lights O1 and O2 can be reflected toward the subsidiary housing 40. Further, since the second functional membrane 91 is also formed on the facing wall section 43, the lights O1 and O2 reflected by the first functional membrane 90 can be further reflected toward the subsidiary outer lens 50. For this reason, some of the lights O1 and O2 reflected by the second functional membrane 91 can penetrate the first functional membrane 90 again to be emitted rearward, and the remaining lights O1 and O2 can be reflected toward the subsidiary housing 40 again.

In this way, the lights O1 and O2 emitted from the first light source 80 and the second light source 85 can be emitted rearward while repeating reflection between the subsidiary outer lens 50 and the subsidiary housing 40 using the first functional membrane 90 and the second functional membrane 91. Accordingly, the lights O1 and O2 emitted from the first light source 80 and the second light source 85 can be emitted rearward in a predetermined light emitting pattern (for example, lighting appearance like a mirror). In particular, according to the embodiment, light can be emitted in a light emitting pattern having a stripe form in which a light intensity is strongest in a portion directly behind the first light source 80 and the second light source 85 and the light intensity gradually weakens toward a central section of the top lens 52.

Accordingly, a lighting function can be provided, and for example, can be appropriately used as light for a position light, stop light or tail light. In particular, since the light intensity is increased most at the portion directly behind the first light source 80 and the second light source 85, prescribed requirements required for the light can be sufficiently satisfied.

Moreover, the millimeter wave radar 60 cannot be further easily seen through the subsidiary outer lens 50 from the outside using the lights O1 and O2 emitted in the predetermined light emitting pattern. Accordingly, presence of the millimeter wave radar 60 can be hidden, an external appearance without a sense of incongruity can be further provided, and design performance can be easily secured.

Further, since the first functional membrane 90 is formed on the subsidiary outer lens 50, the first functional membrane 90 can be used to reflect solar light, and the amount of solar radiation entering the lamp chamber 70 can be minimized. For this reason, an increase in temperature in the lamp chamber 70 can be minimized, an operation reliability of the subsidiary light unit 30 can be improved, and an influence of solar radiation on the millimeter wave radar 60 can also be minimized.

As described above, according to the subsidiary light unit 30 of the embodiment, heat dissipation and serviceability can be improved, radar performance can be stably maintained, and the millimeter wave radar 60 cannot be easily seen from the outside to provide good design performance.

In addition, since the first functional membrane 90 and the second functional membrane 91 are disposed in the lamp chamber 70, for example, dust, moisture, or the like, from the outside cannot easily adhere to the first functional membrane 90 and the second functional membrane 91, and the first functional membrane 90 and the second functional membrane 91 can be kept clean. For this reason, radar performance can be stably maintained for a long time, and the lights O1 and O2 from the first light source 80 and the second light source 85 can be appropriately emitted in a predetermined light emitting pattern.

Further, since the first optical system 83 including the first light source 80 and the second optical system 88 including the second light source 85 are disposed outside the transmission path of the millimeter waves M, the millimeter waves M can be transmitted without interference with the first optical system 83 and the second optical system 88. For this reason, the millimeter waves M can be transmitted while minimizing attenuation of the millimeter waves M and this leads to improvement of radar performance.

In addition, since the lights O1 and O2 from the two light sources of the first light source 80 and the second light source 85 can be emitted rearward while repeating reflection between the subsidiary outer lens 50 and the subsidiary housing 40, the light can be emitted in more varied light emitting patterns, and a lighting function can be further improved.

Hereinabove, while the embodiment of the present invention has been described, the embodiment is simply proposed as an example, and not intended to limit the scope of the present invention. The embodiment can be performed in various types, and various omissions, substitutions, and modifications may be made without departing from the scope of the present invention. The embodiment and variants thereof include, for example, those easily conceivable by those skilled in the art, those that are substantially the same, those that have an equal range, and the like.

For example, in the embodiment, while the example in which the lighting body for a vehicle according to the present invention is applied to the subsidiary light unit 30 that constitutes the tail light unit 10 provided in the rear section of the vehicle has been exemplarily described, it is not limited to this case. For example, the present invention may be applied in combination with a headlight that is a front light provided in a front section of a vehicle. In this case, a distance to a preceding vehicle can be detected using the millimeter waves M and it can be applied to forward monitoring or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lighting body for a vehicle comprising:
   a housing;
   an outer lens that is assembled to the housing so as to cover the housing from an outside of the vehicle and that is configured to form a lamp chamber between the housing and the outer lens;
   a millimeter wave radar that is positioned on a side further inward in the vehicle than the housing and that is disposed an outside of the lamp chamber, and that is configured to transmit millimeter waves toward a side outward of the vehicle through the housing and the outer lens; and
   a light source that is disposed in the lamp chamber and that is configured to emit light toward the side outward of the vehicle through the outer lens,
   wherein the housing includes a housing wall that faces the outer lens in a forward/rearward direction,
   the millimeter wave radar is held in the housing in a state the millimeter wave radar is combined with the housing from an inward side of the vehicle,
   a first functional membrane configured to allow penetration of the millimeter waves and to allow penetration and reflection of the light is formed on the outer lens, and
   a second functional membrane configured to allow penetration of the millimeter waves and to allow at least reflection of the light reflected by the first functional membrane is formed on the housing,
   the first functional membrane is formed on an inner-facing surface of the outer lens, wherein the inner-facing surface faces an inside of the lamp chamber, and wherein the first functional membrane is exposed to an inside of the lamp chamber, and
   the second functional membrane is formed on an inner surface of the housing wall, wherein the inner surface of the housing wall faces the outer lens, and wherein the second functional membrane is exposed to the inside of the lamp chamber and faces the inner-facing surface of the outer lens.

2. The lighting body for a vehicle according to claim 1, wherein a plurality of light sources are disposed outside a transmission path of the millimeter waves.

3. The lighting body for a vehicle according to claim 1, wherein the first functional membrane and the second functional membrane are indium-deposited films.

* * * * *